United States Patent [19]

Strege et al.

[11] Patent Number: 4,977,524
[45] Date of Patent: Dec. 11, 1990

[54] ELECTRONIC MEASURING GAUGE AND APPARATUS FOR ACCURATE VEHICLE STANCE DIAGNOSIS AND GUIDANCE IN EFFECTING WHEEL ALIGNMENT

[75] Inventors: Timothy A. Strege, Maryland Heights; Donald A. Schmieley, St. Louis, both of Mo.

[73] Assignee: Hunter Engineering Company, Bridgeton, Mo.

[21] Appl. No.: 293,014

[22] Filed: Jan. 3, 1989

[51] Int. Cl.[5] .............................. G01B 5/20
[52] U.S. Cl. .................. 364/562; 364/424.04; 377/24; 33/203; 33/763; 33/759
[58] Field of Search ............... 364/559–562, 364/550, 551.01; 377/18, 24, 49; 33/755, 762, 763, 759, 819, 203, 783, 784, 813; 434/373–379, 429, 219, 224, 227, 232, 308, 309, 365, 366, 367, 389

[56] References Cited

U.S. PATENT DOCUMENTS

| | | | |
|---|---|---|---|
| 4,091,550 | 5/1978 | Schrenk et al. | 434/379 X |
| 4,125,894 | 11/1978 | Cashel et al. | 364/442 |
| 4,366,623 | 1/1983 | Bergqvist | 33/763 |
| 4,381,548 | 4/1983 | Grossman et al. | 364/559 X |
| 4,404,639 | 9/1983 | McGuire et al. | 364/424.04 |
| 4,551,847 | 11/1985 | Caldwell | 377/24 |
| 4,612,656 | 9/1986 | Suzuki et al. | 377/24 |
| 4,736,313 | 4/1988 | Nishimura et al. | 33/819 X |
| 4,745,469 | 5/1988 | Waldecker et al. | 358/93 |
| 4,804,328 | 2/1989 | Barrabee | 434/308 |
| 4,811,250 | 3/1989 | Steber et al. | 364/559 X |
| 4,812,125 | 3/1989 | Strashun | 434/219 X |
| 4,835,714 | 5/1989 | Sano et al. | 364/551.01 |
| 4,855,725 | 8/1989 | Fernandez | 434/308 |

FOREIGN PATENT DOCUMENTS 0082358 5/1983 Japan ............... 364/424.04

Primary Examiner—Joseph L. Dixon
Attorney, Agent, or Firm—Gravely, Lieder & Woodruff

[57] ABSTRACT

Electronic measuring gauge and apparatus therefor comprising in combination apparatus and method for use in inspecting and determining vehicle body elevational position relative to the suspension which supports the vehicle body from the wheels or the floor on which the wheels rest. Components are provided to store and present alignment and body elevation measurement points for subsequent call up to suit a specific vehicle presented for inspection and a measuring device for finding the measurements at the measurement points. The apparatus and the method of its use increases the accuracy of inspection and reduces the time required to perform the linear measurements to assist in vehicle wheel alignment operations.

6 Claims, 3 Drawing Sheets

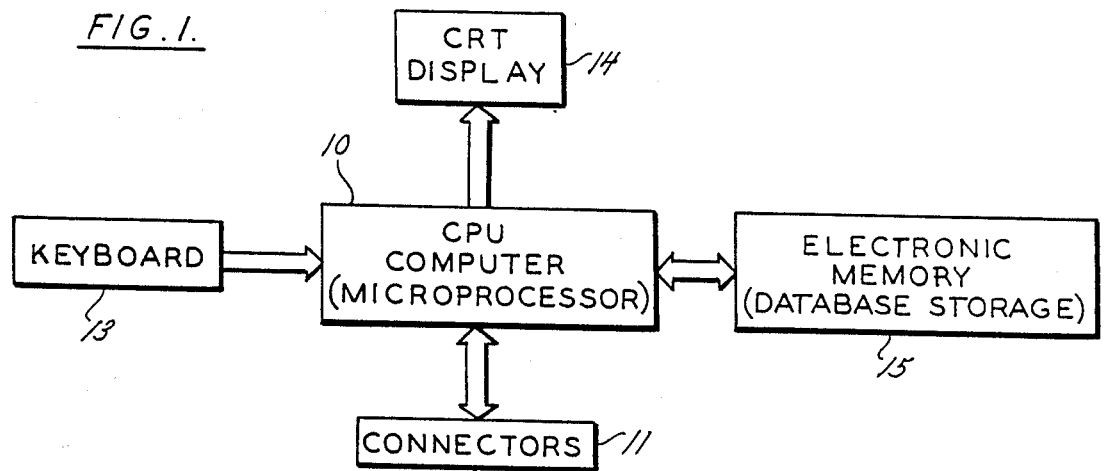
FIG. 1.
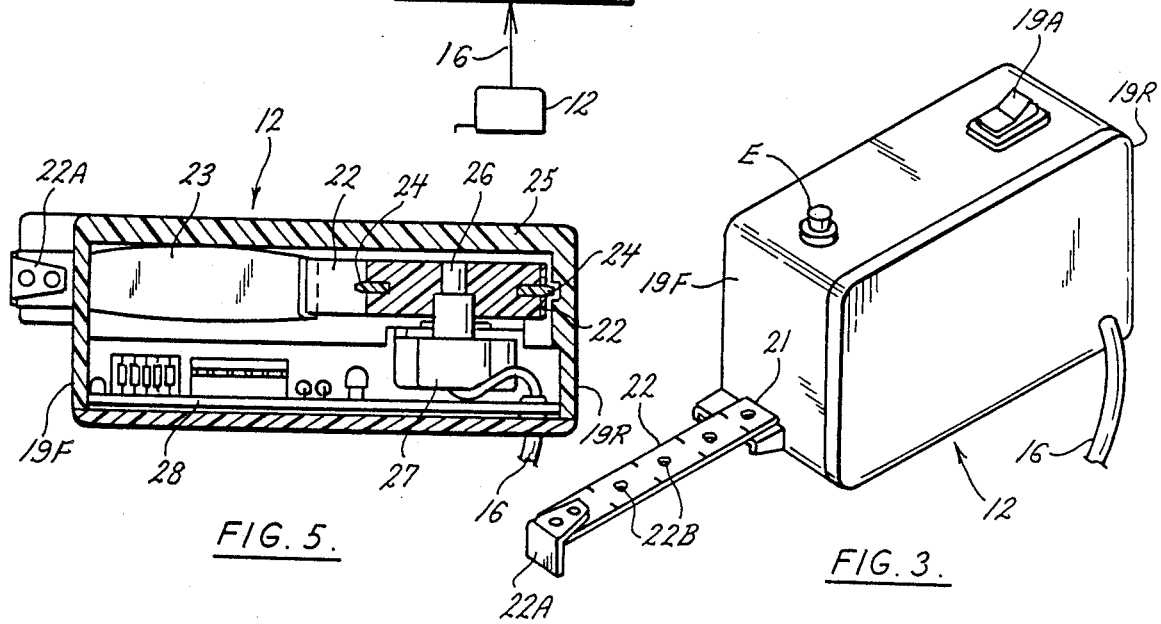
FIG. 5.
FIG. 3.
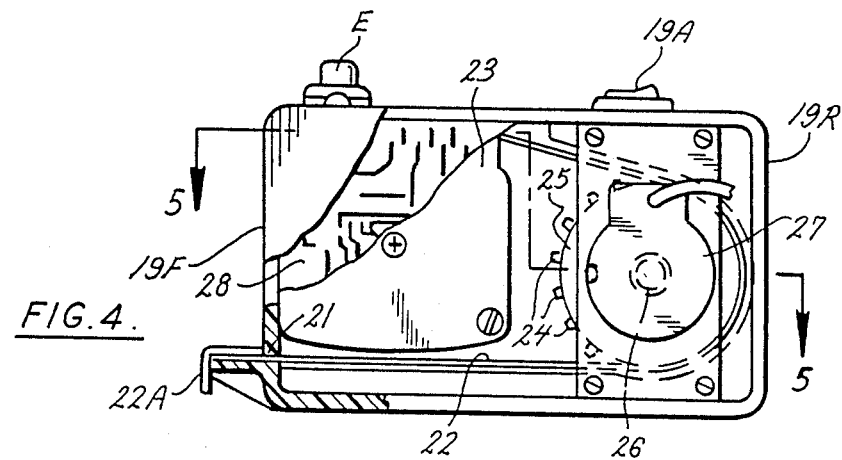
FIG. 4.

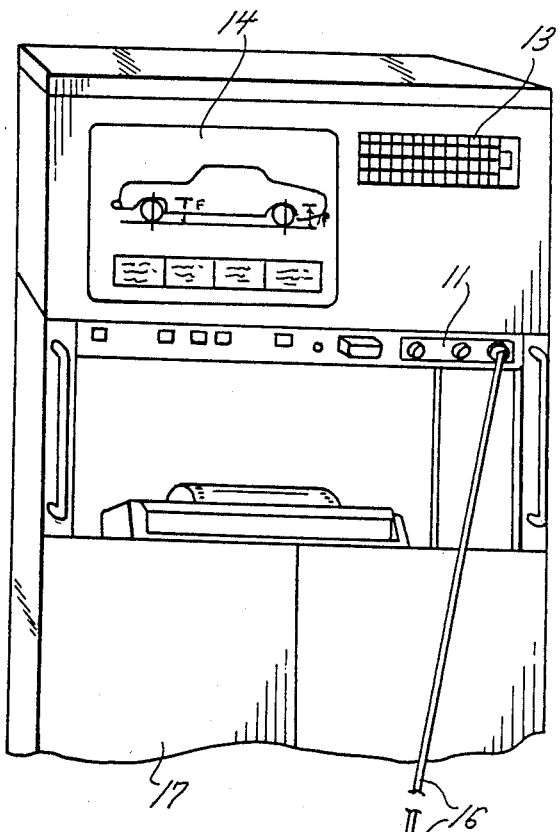
FIG. 2.
FIG. 2A.
MEASUREMENT WITHIN SPECIFICATION CONTINUE WITH ALIGNMENT
FIG. 2B.
MEASUREMENT OUT OF SPECIFICATION CHECK SPRINGS, SHOCKS, BALL JOINTS OR OTHER PARTS
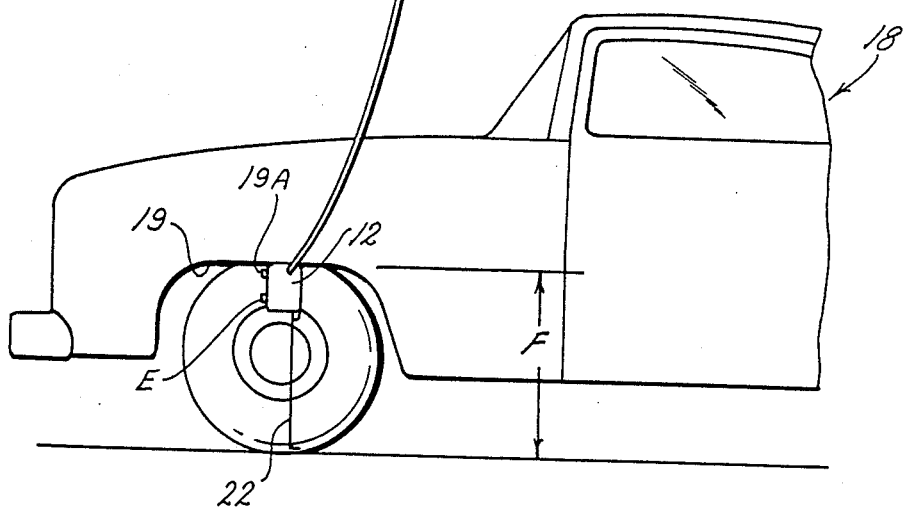

ELECTRONIC MEASURING GAUGE AND APPARATUS FOR ACCURATE VEHICLE STANCE DIAGNOSIS AND GUIDANCE IN EFFECTING WHEEL ALIGNMENT

BACKGROUND OF THE INVENTION

1. Field of the Invention

This invention relates to performing linear measurement on a standing vehicle and translating the measurement into vehicle wheel alignment comparisons with predetermined alignment data.

2. Description of the Prior Art

The prior art relating to hand held digital display tape rulers for linear measuring usage is represented by Soule Jr. No. 4,031,360 of June 21, 1977; Hildebrandt et al No. 4,161,781 of July 17, 1979; Berggvist No. 4,164,816 of Aug. 21, 1979; Tateishi No. 4,178,691 of Dec. 18, 1979; Iwase No. 4,181,848 of Jan. 1, 1980; Tateishi et al No. 4,181,960 of Jan. 1, 1980; Quenot No. 4,186,490 of Feb. 5, 1980; Quenot et al No. 4,189,107 of Feb. 19, 1980; Grant No. 4,242,574 of Dec. 30, 1980; Ramsden et al No. 4,395,630 of July 26, 1983; and Caldwell No. 4,551,847 of Nov. 5, 1985. These examples of linear distance measuring are intended to be self contained in that the distance being measured is presented on the device for visual inspection. None appears to be applicable to the problems associated with automotive checking operations where the ultimate result is one of whether the vehicle is properly maintained for continued safe drivability.

SUMMARY OF THE INVENTION

The many advances in the art of designing and manufacturing vehicles of all types makes the servicing of such vehicles troublesome, especially in respect of the manufacturer's intended stance of the vehicle when the suspension components are new and a predetermined wheel alignment result can be charted or written into the owner's manuals. After a period of use the stance of the vehicle changes with the result that alignment of its wheels is affected and the handling of the vehicle is also affected.

Typically, the ride height of a vehicle changes over time from the manufacturer's intended height. Thus, height measurements need to be taken during a wheel alignment procedure, and such measurements are carried out manually with a suitable tape measure or some other linear measuring device. Changes in the measurements from those determined by the manufacturer when the vehicle is new can affect the alignment specifications for that vehicle, changes can be an indication of worn or damaged parts. The service person must, therefore, make frequent reference to the manufacturer's specification or published literature to determine, not only where measurements need to be taken, but what dimensions are correct. Thus, the service person must either memorize measurement values or make frequent reference to the manufacturer's specification or to appropriate printed literature to determine the extent of deviations and whether the deviations are greater than or less than a predetermined value. Due to the difficulty and time consumed by such tasks, often a vehicle is not checked for the proper ride height, and adjustments such as wheel alignment are made with the ride height assumed to be correct. The adjustments that are made and billed for are meaningless and can render the vehicle unsafe to operate. This scenario is quite common.

The current procedures being followed are an inefficient use of the time of a service person, and the risk is that human error may get in the way of achieving proper and safe alignment results. Further, the present invention will tend to ease the workload of the service person and lower the probability of human error, thus making the critical measurement of vehicle ride height more practical to perform.

It is therefore, an object of the present invention to provide an electronic measuring gauge which performs measurements and transmits the measurements to a computer memory in a console by the touch of a button on the hand held gauge.

It is an object of this invention to provide a database in the console where predetermined measurements are stored for comparison with measurements taken on a vehicle and the results of comparisons can be displayed to prompt the service person on what adjustment need to be made.

A further object of the present invention is to provide a database with information of a diagrammatic character which will be effective to prompt a service person where to take required measurements, and when taken if they are within the specification for the particular vehicle being tested.

The foregoing objects of the present invention can be summarized in the result that the access to all outside literature and specification sheets can be eliminated and the possibility of human error has been practically overcome upon data being stored electronically in a console equipped with a visual data display. The time and skill required to make vehicle measurements has been greatly reduced, thus making a measurement practical which before was impractical.

BRIEF DESCRIPTION OF THE DRAWINGS

The invention is illustrated in the following drawings, wherein the views are not intended to be to any scale but to reveal cooperating relationships:

FIG. 1 is a schematic representation of a system of apparatus and components by which the present invention can be put into practice;

FIG. 2 is a schematic view of the control console and a vehicle presented for inspection;

FIG. 2A is an enlarged view of the CRT screen for prompting the technician as a result of use of the system for measuring height indicated for the front wheels F and the rear wheels R, such a view being shown in the CRT of the console seen in FIG. 2;

FIG. 2B is a view similar to FIG. 2A but prompting the technician to check for worn or damaged parts;

FIG. 3 is a perspective view of a hand held measuring gauge showing one form of measuring tape, operating buttons and the cable by which the gauge is connected to a console;

FIG. 4 is a side elevation of the typical hand held gauge of FIG. 3 with the cover wall partly broken away to show the internal components;

FIG. 5 is a sectional view of the gauge as seen along line 5—5 in FIG. 4;

DETAILED DESCRIPTION OF THE EMBODIMENT

Figure 6:
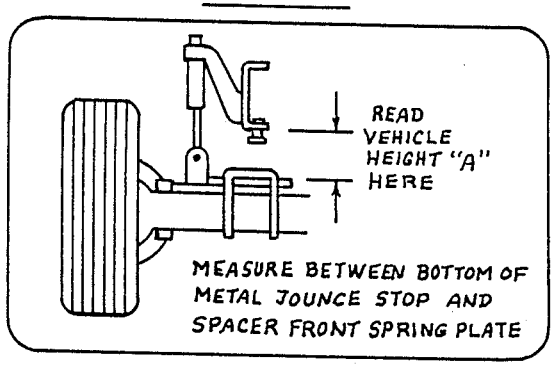
FIG. 6 is a schematic representation of a fragmentary part of a vehicle with an indication to prompt the technician where to take a measurement.

Looking at the schematic representations in FIG. 1, it can be understood that the central processing unit 10 is a computer or microprocessor having an I/O connector 11 to which a signal input connects from a hand held measuring gauge or device 12. The computer is provided with a keyboard 13 used to punch-in data for use in the computer 10. The output of the computer 10 consists of a CRT screen 14 to display the data desired by the technician, and an electronic memory 15 or data storage is connected into the computer 10 which passes that data into the CRT display as called for. The foregoing apparatus answers a need to more accurately check the wheel alignment characteristics of vehicles on the basis of manufacturer's data when there is no wear or damage to the suspension system. The greatest use for this invention is to be able to check the vehicle alignment after a period of use, or at stated intervals of use when it becomes important to learn whether the components of the suspension system have deteriorated to the condition when replacements are needed.

Having presented a brief outline of the invention theory, the details are more specifically disclosed in FIG. 2 in relation to the connection 16 of the device 12 into the organization of the components making up the subject invention as seen in FIG. 1. A vehicle 18 is first presented in a place convenient to the console 17 so that a height measurement can be made with the use of the hand held tape gauge 12 positioned at a wheel well opening 19. The linear height is picked up in the gauge 12, and the value so measured is transmitted by the connecting cable 16 into the console 17. The console 17 may be moved about the vehicle 18 to be within easy cable reach as the hand held gauge 12 is moved from the front to the rear, or other areas of the vehicle.

FIG. 2 depicts a representation of the vehicle 18 on the CRT screen 14 in the console 17. The purpose is to prompt the technician to take a measurement at F for the front wheel well and another measurement at R for the rear wheel well. These measurements will, at least partly, determine the desired stance of the vehicle 18.

In FIGS. 2A and 2B there can be seen an important feature of the system of this invention. Let it be assumed that the device 12 in FIG. 2 has been properly applied to the vehicle 18 and the measured result has been transmitted to the console 17 by means of a switch or push button E to signify that the measured distance F will be entered in the console through the I/O connector 11. However, since the device 12 has been positioned with the rear surface 19R against the wheel well 19; it is necessary to be able to add the dimension of the housing for the device 12 to the exposed length of the tape 22 which is pulled out of slot 21 (See FIG. 3) in the front surface 19F of the device 12. To add the housing dimension it is necessary to operate switch or button 19A which adds that housing dimension. Having taken the foregoing steps of the method of use of the device 12, the measured data is procured in the console and the CRT display presents the results in one of two ways, seen in either FIG. 2A or FIG. 2B. If the screen shows the wording in FIG. 2A it tells the technician that the measured distance is acceptable and continue the alignment. If, on the other hand, the wording in FIG. 2B appears, the wording tells the technician that the measured distance is out of specification and to check springs, shocks, ball joints and other parts. The indicated prompting should be performed before going further.

Refering now to FIGS. 3, 4 and 5, there can be seen a modified hand held tape gauge 12 which is assembled in a suitable case. The case of gauge 12 has a slot 21 from which the tape 22 emerges beginning with the ususal end fitting 22A to hook onto a fixed component or be held in any convenient manner. The case of gauge 12 houses a spring powered tape which is pulled out of its housing 23 and engages the teeth 24 of a sprocket wheel or rotor 25 (FIG. 5) mounted on a shaft 26 which is common with an encoder device 27. The tape 22 is formed with uniformally spaced apertures 22B which are engaged by the sprocket teeth 24. As the tape 22 is extended from the case 12, the apertures 22B engaging with the teeth 24 which rotates the sprocket 25 and that, in turn, rotates the encoder 27, which translates the rotations into linear measurement.

The case 12 encloses a microprocessor circuit board 28 which carries the required circuitry. The board 28 (seen only in fragmentary part) includes a quadrature decoder and counter circuit associated with the encoder device 27 driven by the extension movement of the tape 22. The microprocessor board 28 is connected by the usual cable 16 into the console 17 at the I/0 connector 11. The data from the circuit on board 28 is transferred to the computer 10 upon actuating switch E which enters that data. The measurement signal is procured by the computer with vehicle specification data previously stored in the electronic memory. The result is that the parameters of the memory being stored can have the proper alignment specifications of the vehicles to which they relate, and deviations can indicate worn or damaged parts.

When ride height measurements were taken in the past the technicican had to have published data readily at hand so the specifications for the particular vehicle could be noted for places where measurements needed to be taken and thereafter the technician would have to look in that data for the values of the measurements. That approach is regarded as an inefficient use of the time of a technician and can result in a source of errors.

The present invention is able to ease the workload on a technician and lower the probability of human errors. The invention is present in the combination of an electronic measuring gauge 12 which sends the measurements being taken to the console 17 by the touch of a button E which enters the measured value.

Referring again briefly to FIG. 2, the keyboard 13 at the console 17 is set up to allow a technician to key into the computer 10 the type of vehicle that is presented for alignment inspection. The memory 15 of the console 17 is supplied with specification information with respect to many different vehicles of many different manufacturers. This enables the console 17 to accommodate a wide variety of vehicles. It is assumed that the technician has recognized vehicle 18 and has keyed in the information so that there appears on the screen 14 of the CRT the silhouette image of that vehicle. For the purpose of this discussion the actual vehicle is depicted on screen 14. By looking at the vehicle 18 on the screen of FIG. 2 the technician is prompted to utilize the hand held tape gauge 12 to make the measurement F which is indicated at the front wheels. The technician does not have to read the indicia on the tape 22 of the gauge 12 because when the dimension F has been reproduced on the gauge 12 the technician simply pushes the enter button E and that measurement is then entered against the specification for that particular vehicle. The technician is also prompted, by looking at the screen 14 to make the measurement R for the rear wheels of the vehicle 18, and again when the tape 22 has been extended properly and the button E actuated that additional information is transferred to the specification for that particular vehicle. In each case there is no need for the technician to visually read the tape 22 as the only operation needed is to extend the tape the proper distance at the front and rear wheels and for each measurement to press button E to enter that measurement into the aligner console 17. It follows that either the prompting words seen on screen of FIG. 2A or the screen of FIG. 2B will appear. FIG. 2 illustrates in the CRT the vehicle 18 which prompts the technician to take the next measurement.

Figure 7:
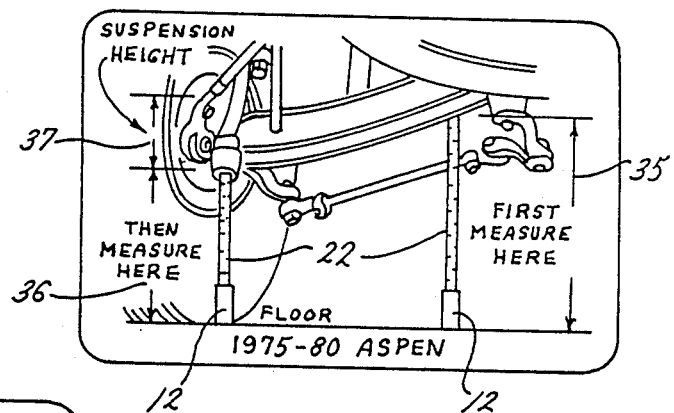
FIG. 7 is a further schematic representation of a fragmentary portion of a vehicle presentation on the CRT view to prompt the technician on where to take measurements.
Figure 8:
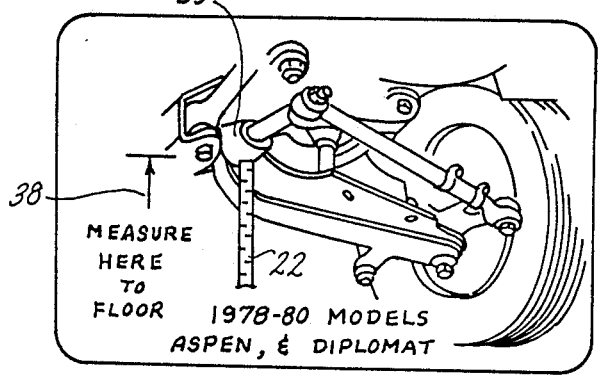
FIG. 8 is yet another fragmentary portion of a vehicle as viewed on the CRT screen to further prompt the technician on where to obtain measurements.
Figure 9:
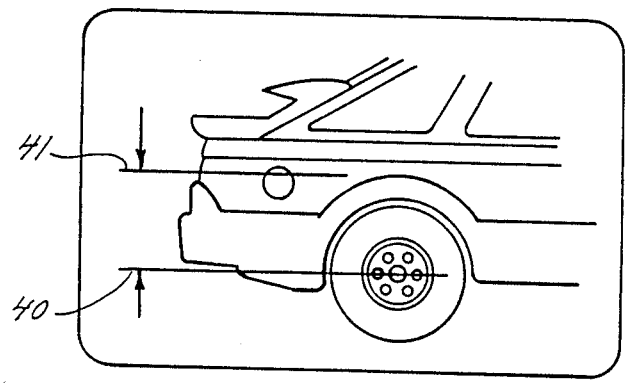
FIG. 9 is a fragmentary view of a vehicle to prompt measuring the vehicle body elevation from its supporting wheel.

In a similar step, the technician may see the screen of FIG. 7 of the suspension components of a vehicle. In this case two measurements are prompted, one is indicated at the arrow 35, and the second measurement is indicated at the arrow 36. A calculation must be performed in the console to determine the difference between those two measurements and that is indicated by the arrow 37. This result will be used to provide the value of the suspension height. In like manner, as in FIG. 8, other specific measurements can be prompted for the suspension system of a vehicle. In the case of FIG. 9, a measurement 38 from the floor to the component 39 can be entered in the microprocessor in the console 17 to determine the corresponding alignment specification. By comparing the specification with the measurements that have been prompted the present system is able to indicate what parts, when out of specification, are likely to be worn or damaged, thus further assisting the technician.

If for some reason the tape 22 was not fully retracted before it was plugged into the console, the electronics in the microprocessor 10 would initialize to zero, but the printed tape 22 would show a positive number. This feature illustrates the self zeroing ability of the system, and as the tape 22 retracts back into case 12, instead of the electronics showing a negative value, such as incremental movement from the encoder, the electronics will simply continue to reset to zero until the tape 22 is again pulled out in a positive manner. This feature makes the device 12 self zeroing every time it is plugged in, whereby the possibility of error due to the wear of the device 12 is reduced.

Attention is directed to FIG. 9 where a different vehicle has been called up on the CRT screen 14 to illustrate a different character of prompted measurement as between the position of the body of a vehicle with respect to the center of the axle for the wheel. A suitable distance is prompted between the axle base line 40 and the chosen vehicle body reference line 41. The difference between these two reference lines 40 and 41 provides an indication of whether the suspension spring system is supporting the body at the proper elevation from the axle.

Prior to our invention coilable tape rules were used to measure the ride height of a vehicle during the process of wheel alignment. The prior procedure called for the technician to look at a specification sheet or book or manual to find where to make the measurement. The conventional coilable tape is used to find the measurement at the places so indicated, after which the measurement taken is then compared with the specification. Very often the proper specification information is not available to the technician doing the work. Also, the visual inspection of the indicia on the tape rule being used, and any subsequent additions or subtractions, especially with fractions, can introduce increased probability of human error. Accessing the correct specification table with the measured number can introduce another possible error source. All of these factors contribute to the fact that ride height measurements are often not performed by the technician.

The present invention combines appropriate wheel alignment apparatus which has been supplied with the specification information and the proper places to obtain measurement values. Thus, the alignment apparatus will provide a technician with a visual presentation of where measurements are to be taken, an electronic tape rule connected into the apparatus is used to make the measurements, but no visual reading of the indicia on the tape is necessary. When a measurement has been made, the result of that measured value is simply entered by the press of a button E into the console 17 and is thus recorded and displayed on the CRT 14. The console then performs all required mathematical operations on the measured numbers, accesses the proper specification tables, wheich have been stored in memory 15, and displays the corresponding alignment (caster, camber) specifications for proper alignment of the vehicle at the current ride height.

As an example of the merits of the present method there is shown in tabular form an example for a given vehicle, such as a current commercial vehicle, subject to varying load condition. See FIG. 6 which is displayed on the CRT screen 14 when reading the table.

| Vehicle | Dimension A | | Caster degrees | | Camber degrees | |
| --- | --- | --- | --- | --- | --- | --- |
| | Min | Max | Min | Max | Min | Max |
| F | 2 | 3 | 9.625 | 11 | −2.1 | −.625 |
| | 3.5 | 3.75 | 7.75 | 9 | 11.125 | .50 |
| | 4 | 4.25 | 6.375 | 7.75 | −0.25 | 1.25 |
| | 5 | 5.25 | 3.875 | 5.25 | 1.25 | 2.75 |

Interpretating the foregoing table, it appears that vehicle F is subject to load variations indicated by the dimensions A in the first column. The dimension A for a heavy load can vary between 2 inches minimum to 3 inches maximum, assuming the dimension A is 2 inches, the caster can be between 9.625 degrees and 11 degrees, and correspondingly the camber can be between negative 2.1 degrees and negative 0.625 degrees. It the readings are not within the minimum and maximum limits set out in the table, the vehicle is out of specification and an inspection is indicated. For a light load the dimension A can be 5 inches. Then reading across, the caster and camber values are indicated in degrees as varying for caster between 3.875 and 5.25 degrees, and for camber between 1.25 and 2.75 degrees.

The device for effecting the measurement may be an optical shaft encoder mounted in the tape rule housing.

A sprocket wheel is mounted on the shaft of the encoder. A tape with indicia such as equally spaced holes for driving a sprocket will be used to take measurements. A spring will retract or wind up the tape when not in use. An "enter measurement" button or switch will be provided on the housing to enter the measurement.

An optical shaft encoder is a non-contacting direct rotary to digital converter. A code wheel rotates between a LED light source and a series of precisely spaced detectors. The internal circuitry of the encoder outputs two quadrature waves which can be electronically decoded to indicate the direction and magnitude of rotation of the code wheel. Digital counter circuitry is employed to decode the quadrature signals and store the value of rotation which can then be digitally displayed. The advantage of the foregoing means is accuracy and ease of use with wheel alignment apparatus as it can be directly connected.

The foregoing description has set forth a simple and accurate method of entering measured data into the microprocessor in the console 17 for the purposes of assisting in the aligning of the vehicle wheels or in assisting in the repair of a vehicle. The method consists of electronically storing vehicle illustrations and measurement points, such as those shown in FIGS. 2 and 6 to 9. The method comprises means for displaying the vehicle illustrations; electronic storage of known vehicle alignment specifications and associated specification tables relating vehicle predetermined measurements to the alignment specifications; electronic measuring instrument which can transmit sensed linear data to the aligner; entry of the obtained measurements into the aligner for comparison between prompted input measurements with the predetermined stored tables and determining correct corresponding alignment specifications; and finally means of displaying correct alignment specifications with diagnosed vehicle measurements for determining the amount of out of specification which can be interpreted to indicate worn or damaged suspension parts.

What is claimed is:

1. A method for guiding a service person in determining vehicle body elevation stance positions relative to the suspension means which supports the body from the wheels or the floor on which the wheels stand, the method comprising:
   (a) providing electronic means for storing required body elevation positions for a given vehicle relative to the supporting wheels and the corresponding predetermined desired measurement data for the given specific vehicle;
   (b) calling up from storage the body elevation positions related to a specific given vehicle corresponding to a vehicle presented for inspection;
   (c) presenting electronically a visual rendering on a display of the specific vehicle called up together with depicted thereon the locations from which to make body elevation position measurements;
   (d) applying an electronic linear measuring device at each depicted location visually presented on the display;
   (e) electronically entering each measurement by actuation of said electronic linear measuring device for comparison with said predetermined desired measurement data; and
   (f) making a comparison between the stored measurements and the entered measurements for indicating whether the measurements are in or out of agreement with the predetermined desired measurement data for the specific vehicle body called up.

2. The method of claim 1 wherein the finding by comparison that a measurement is out of agreement with specifications prompts the service technician to inspect for probable defective parts which are listed on the display for the specific vehicle called up.

3. The method of claim 1 wherein said body elevation position measurements are taken for determining the suitability for wheel alignment of the vehicle so called up.

4. A method of directing a service person in the entering of electronically obtained measurement data from a specific vehicle into a vehicle alignment apparatus having a console for the purpose of storing vehicle stance measurements for comparison and for directing the determination of vehicle body positions which affect alignment of vehicle wheels, the method comprising:
   (a) electronically storing illustrations of vehicle body representation and measurement locations;
   (b) displaying selected illustrations from the storing thereof which are determined to match a vehicle that is presented for wheel alignment;
   (c) electronically storing vehicle specification tables relating the measurements to alignment specification;
   (d) prompting the locations for making linear measurements of a vehicle body representation of measurement locations selectively illustrated;
   (e) electronically entering linear measurement so made into the electronically stored vehicle specification tables for finding correct corresponding alignment specifications;
   (f) indicating and storing selectively the correct body measured alignment specifications, or an out of specification condition; and
   (g) using stored correct alignment specifications as the basis for effecting the corresponding wheel alignment of the measured vehicle.

5. Apparatus for use in inspecting and determining vehicle body elevational positions relative to the suspension means which supports a vehicle body from the wheels on the floor on which the wheels rest, the apparatus comprising:
   (a) wheel alignment console means having a storage memory to receive and make available to a service person alignment data for a series of predetermined vehicles, said memory receiving data on vehicle elevational information and location of points for measuring elevation;
   (b) means at said console for selecting a predetermined vehicle alignment data and elevational information corresponding to a vehicle presented for inspection and determination of body elevation positions;
   (c) means in said console means for displaying a representation of portions of the vehicle presented for inspection, said display means presenting at least one location for initial inspection;
   (d) a linear measuring device which electronically transfers measurements into said console means for making said inspection measurement at said displayed location;
   (e) circuits in said measuring device and comprising a shaft encoder for entering into said console the completed linear measured value for visual display; and (f) indicating selectively correct alignment specifications, or an out of specification condition.

6. The apparatus set forth in claim 5 wherein said shaft encoder is responsive to means engaging a retractable tape which is extracted from a housing of the measuring device to the indicated length by the service person.

* * * * *